(12) United States Patent
Cui et al.

(10) Patent No.: US 8,666,934 B2
(45) Date of Patent: Mar. 4, 2014

(54) SYSTEM AND METHOD FOR MANAGING ACTIVITIES IN PROJECT MANAGEMENT

(75) Inventors: Jie Cui, Beijing (CN); Paul Brian Moody, Hyde Park, VT (US); Hui Su, Beijing (CN); Qiang Zhang, Beijing (CN); Chen Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1439 days.

(21) Appl. No.: 11/848,643

(22) Filed: Aug. 31, 2007

(65) Prior Publication Data

US 2008/0059516 A1 Mar. 6, 2008

(30) Foreign Application Priority Data

Aug. 31, 2006 (CN) .......................... 2006 1 0126474

(51) Int. Cl.
*G06F 17/30* (2006.01)

(52) U.S. Cl.
USPC ....................................................... 707/603

(58) Field of Classification Search
USPC ........... 707/999.103, E17.048, 751, 603, 791, 707/804
See application file for complete search history.

(56) References Cited

U.S. PATENT DOCUMENTS

| 7,386,797 | B1* | 6/2008 | Chatterjee et al. ............ 715/751 |
| 7,437,304 | B2* | 10/2008 | Barnard et al. .............. 705/7.15 |
| 7,440,905 | B2* | 10/2008 | Ellis et al. .................... 705/7.28 |
| 7,603,653 | B2* | 10/2009 | Sundararajan et al. ....... 717/105 |
| 7,673,340 | B1* | 3/2010 | Cohen et al. .................... 726/22 |
| 7,805,449 | B1* | 9/2010 | Bone et al. .................... 707/751 |
| 8,442,850 | B2* | 5/2013 | Schorr et al. ................. 705/7.12 |
| 2005/0027577 | A1* | 2/2005 | Saeed ......................... 705/7.12 |
| 2006/0070019 | A1* | 3/2006 | Vishnumurty et al. ....... 717/101 |
| 2006/0173906 | A1* | 8/2006 | Chu et al. .............. 707/999.102 |

FOREIGN PATENT DOCUMENTS

EP 0994429 A1 * 4/2000 ............. G06F 17/60

* cited by examiner

*Primary Examiner* — Cam-Linh Nguyen
(74) *Attorney, Agent, or Firm* — William Stock; Anne Vachon Dougherty

(57) ABSTRACT

A system, a method and a computer program product for managing activities in project management. The system includes an activity sensor for collecting activity data from user inputs and event logs; a model builder for creating a project model by integrating said activity data with project tasks; and a central repository for storing the project model created by said model builder. The method includes steps for collecting activity data from user inputs and event logs; creating a project model by integrating said activity data with project tasks; and storing the created project model. Accordingly, the project manager can track various activities that occurred during the project and team members can share information and knowledge.

12 Claims, 10 Drawing Sheets ions depicted in FIG. 1;
SYSTEM AND METHOD FOR MANAGING ACTIVITIES IN PROJECT MANAGEMENT

FIELD OF THE INVENTION

The present invention relates to the field of information technology and, more particularly, to a system and method for managing activities in project management.

BACKGROUND OF THE INVENTION

Project management relates to management of collaborative work among a project manager and team members during a project. Good collaboration is one of key factors to result in success of a project. Collaboration always emerges from unstructured, ad-hoc communications, including brainstorming, net-meeting, email exchanges, document modifications, etc. And the contents in the collaborative processes have been widely spread in varieties of applications and corresponding files thereof. The contents in the collaborative processes are important to cooperators and ought to be shared as knowledge.

With the fast development of globalization and information technology, a new work style that people in a project is cross-region, cross-organization and cross-function has emerged. The project productivity is more than the sum of work performance of individual members, and instead, the performance of any one member influences the performance results of all other members. Thus, project management requires tight coordination between the project members and requires the project manager to well know the whole progress and conduct effective examination.

Collaborative communication allows people to exchange tacit knowledge and helps to turn tacit knowledge into explicit knowledge. Thus, interactions and communications of "ad-hoc" type in the task execution process frequently occur between varieties of project members. Generally speaking, related data in a project is widespread in different applications and stored as individual files. Although this communication approach is comparatively flexible, a user is required to manually associate the various information with the project if there is a need to analyze task interdependence, track the project process and store as knowledge for later use. However, it will become difficult to manage and examine the data if a project lasts for a too long period of time or there are too many project members.

With the rapid improvement of computer capability, a large number of project management software has emerged. Conventional project management software is mainly characterized in that they aim to improve project managers' ability to plan tasks, identify and mitigate risks, and redesign project processes by Gantt charts, PERT diagrams, resource histograms, and project status tracking. As to conventional project management software, the key issue concerned is to schedule, and more attention is paid to project inputs and outputs, while task interdependence analysis, process management, document management, asset management, reuse, etc are often ignored.

For example, Microsoft Project 2000 is very popular in project management at present, but it does not provide centralized management of multiple related activities in executing a task. Users can only know work results via the software but have no knowledge of the activities during the work. This leads to inefficient information sharing between project members and hard examination and estimation on the project by the project manager.

Groove Virtual Office (a software product by Microsoft Corporation) provides a solution for managing a distributed project team, which realizes management by getting every member on the same platform, meeting virtually with team members. It focuses on the shared working environment for communication but does not specify communication of this kind with the project tasks as the object. Thus, team members cannot have a clear understanding of the relationship between project tasks and virtual communication, and the process cannot be effectively tracked.

Activity Explorer, a research prototype from IBM, supports management of activities organized by different thematic contents through shared objects and dynamic membership. It only acts as a platform for sharing and managing various activities which are not for a target of project tasks or objectives.

To sum up, there is a need to provide a solution for managing activities in order to overcome problems in project management of the prior art.

SUMMARY OF THE INVENTION

According to one aspect of the present invention, provided is a system for managing activities in project management, comprising: an activity sensor for collecting activity data from user inputs and event logs; a model builder for creating a project model by integrating said activity data with project tasks; and a central repository for storing the project model created by said model builder.

According to another aspect of the present invention, provided is a method for managing activities in project management, comprising the steps of: collecting activity data from user inputs and event logs; creating a project model by integrating said activity data with project tasks; and storing the created project model.

Further, the present invention provides a computer program product containing computer program capable of implementing the method of the present invention.

According to the present invention, the project manager can well examine various activities during the project, and team members can share information and knowledge.

BRIEF DESCRIPTION ON THE DRAWINGS

Other objects and effects of the present invention will become more apparent and easier to understand from the following description, taken in conjunction with the accompanying drawings wherein:

FIG. 1 schematically depicts a network system in which an embodiment of the present invention can be implemented;

In all the above drawings, like reference numerals designate the same, similar, or corresponding features or functions.

DESCRIPTION OF THE PREFERRED EMBODIMENTS

The basic idea of the present invention is to use an activity sensor to collect activity data from user inputs and event logs, to use a model builder to integrate said activity data with tasks of a project to create a project model, and to use a central repository to store the project model created by said model builder. In this way, the project manager can track various activities that occurred during the project, and team members can share knowledge.

Preferred embodiments of the present invention will be described below with reference to the accompanying drawings.

Figure 1:
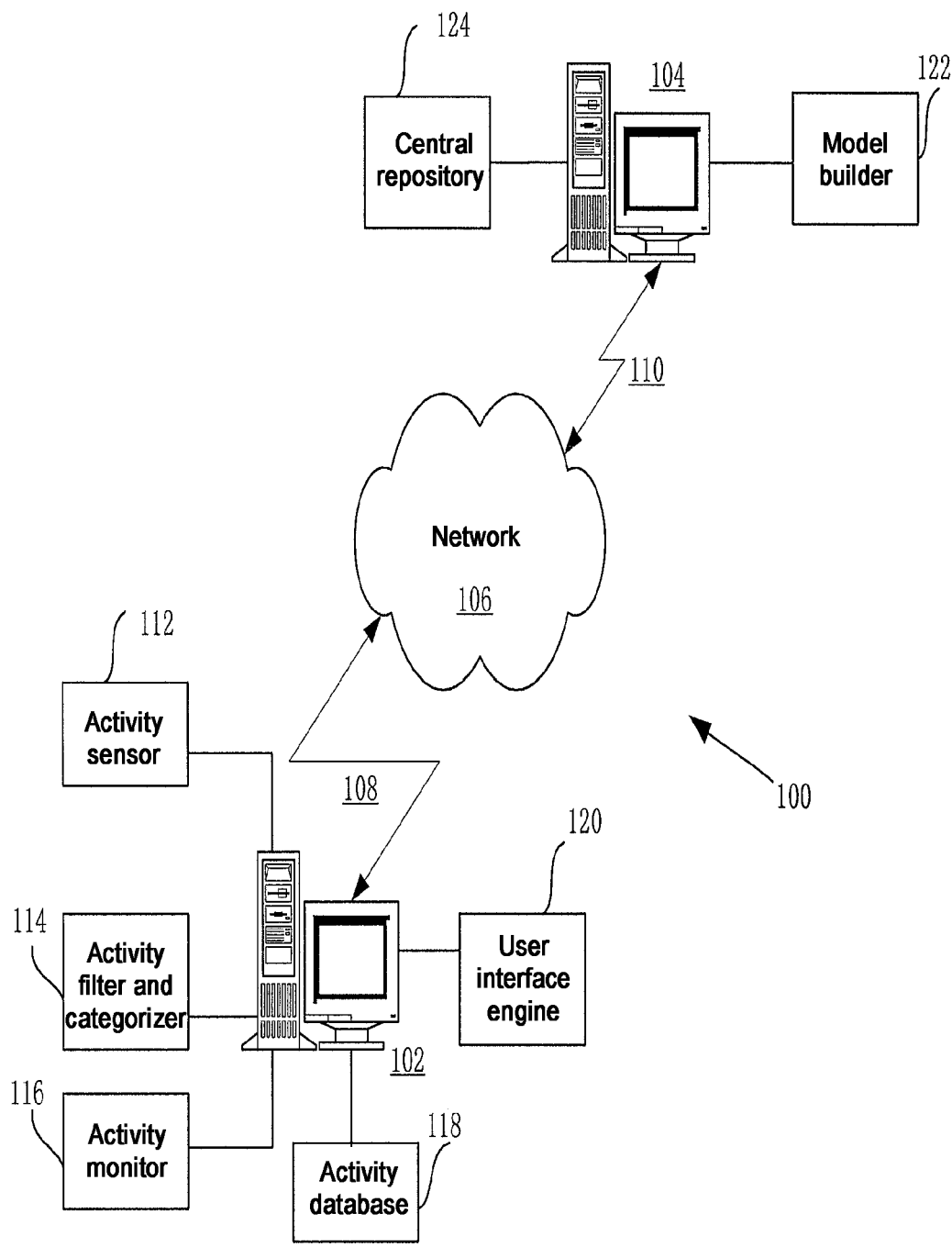

FIG. 1 schematically depicts a network system 100 in which the system and method for managing activities in project management according to the present invention can be implemented. As depicted in FIG. 1, network system 100 comprises: a client 102, a server 104, and a network 106. Client 102 and server 104 can be lap-top computers, small computers, medium computers, etc. Client 102 and server 104 are connected to network 106 via a link 108 and a link 110, respectively. In other words, client 102 can communicate with server 104 via link 108, network 106, and link 110. Links 108 and 110 can be wired links or wireless links, such as coaxial cables, optical fibers, satellite links, etc. Likewise, network 106 can be a wireless network, a wired network, or a combination thereof. Further, network 106 can be a local area network, a metropolitan area network, a wide area network, or a combination thereof. For example, network 106 is the Internet.

Of course, those skilled in the art should understand that only one client 102 is depicted here for the purpose of simplicity. As a matter of fact, other clients can be connected on network 106. Therefore, in order to be distinguished from each other, the clients and server can have IDs uniquely identifying themselves, such as IP addresses, uniform resource locators (URL), etc.

Various software is installed on client 102, including operating system software, such as Windows XP or Redhat Linux 9.1, and application software installed in accordance with needs, including email software such as Microsoft Office Outlook, instant message software such as MSN Messenger, netmeeting software such as Microsoft Netmeeting, word processing software such as Microsoft Office Word 2003, and Web browser software such as Microsoft Internet Explorer 6.0. Also, various software can be installed on server 104, including operating system software, such as Windows XP or Redhat Linux 9.1, and application software installed in accordance with needs.

On client 102, an activity sensor 112, an activity filter and categorizer 114, an activity monitor 116, an activity database 118, and a graphical user interface engine 120 are included. On server 104, a model builder 122 and a central repository 124 are included. The functions of these entities and interrelations between them will be described below.

Figure 2:
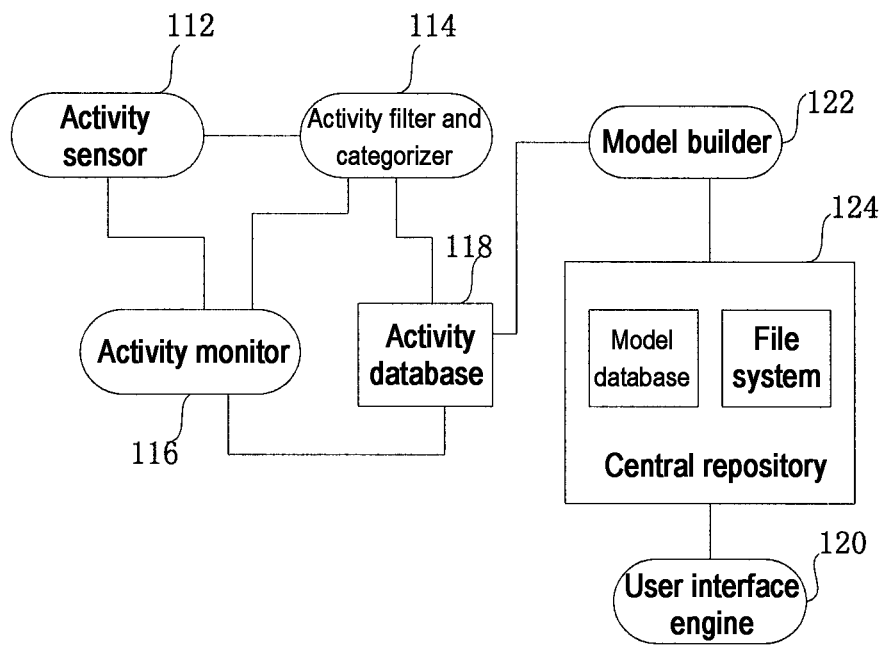
FIG. 2 depicts in greater detail respective entities comprised in the network system depicted in FIG. 1 and interrelations between them.

FIG. 2 depicts in greater detail respective entities comprised in FIG. 1 and interrelations between them.

On client 102, activity sensor 112 is responsible for collecting activity data from user inputs and event logs. Correspondingly, activity sensor 112 can comprise two parts which are a user input interface and an event log engine (not shown), respectively.

It should be noted that in essence, an event log is also created through user input. Here, for the purpose of illustration, the event log means specific user input different from ordinary user input. That is to say, the event log means user input of operations of tasks of a project, wherein operations of tasks of a project include a task change operation, and task change includes change of task created time, delay of the task, change of progress, etc.

Figure 3:
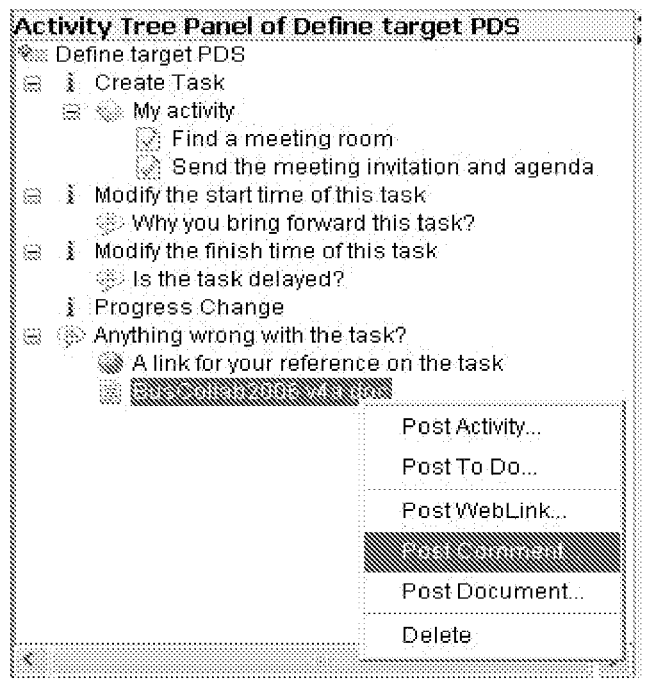
FIG. 3 depicts a graphical user interface and a user input interface that manage activities of a task in project management according to an embodiment of the present invention.

FIG. 3 depicts an example of interface and user input interface that manage activities of a task in project management according to an embodiment of the present invention. Through the user input interface, a user can perform all kinds of posting activities, such as posting Activity, posting To Do, posting Weblink, posting Comment, posting Document, etc. Further, the user can perform deleting activity operation through the user input interface.

What is depicted in FIG. 3 is an activity tree of the task Define target PDS. Some activities (such as the activity My activity) are posted by the user through the user input interface, and some activities (such as the activity Create Task, the activity Modify the start time of this task) are recorded by the event log engine. Moreover, some activities can include sub-activities. For example, the activity Create Task can include the activity My activity. In other words, activities can be organized in a tree structure.

For example, after a user right clicks the mouse on the desired input item (such as activity item or even task item), a menu will pop up. The menu comprises items the user can post. The user can select an item to post by using a mouse or keyboard. After the user selects an item to post (such as to post comment), a dialog box will appear, and the user can input into the dialog box some data associated with the activity.

Figure 4:
FIG. 4 depicts a dialog box appearing during operation of the user input interface depicted in FIG. 3.

FIG. 4 depicts a dialog box popping up when the user selects to post Activity. The user can input some data through the dialog box, such as title, description, etc.

For another example, when the user selects to post Document, a dialog box will also appear, and the user can input some descriptions of the document into the dialog box and select the document from a file browser.

The event log engine records task change information by automatically capturing the user's operations on the project tasks, and the task change information includes change of task created time, delay of task, change of progress and the like.

Figure 5:
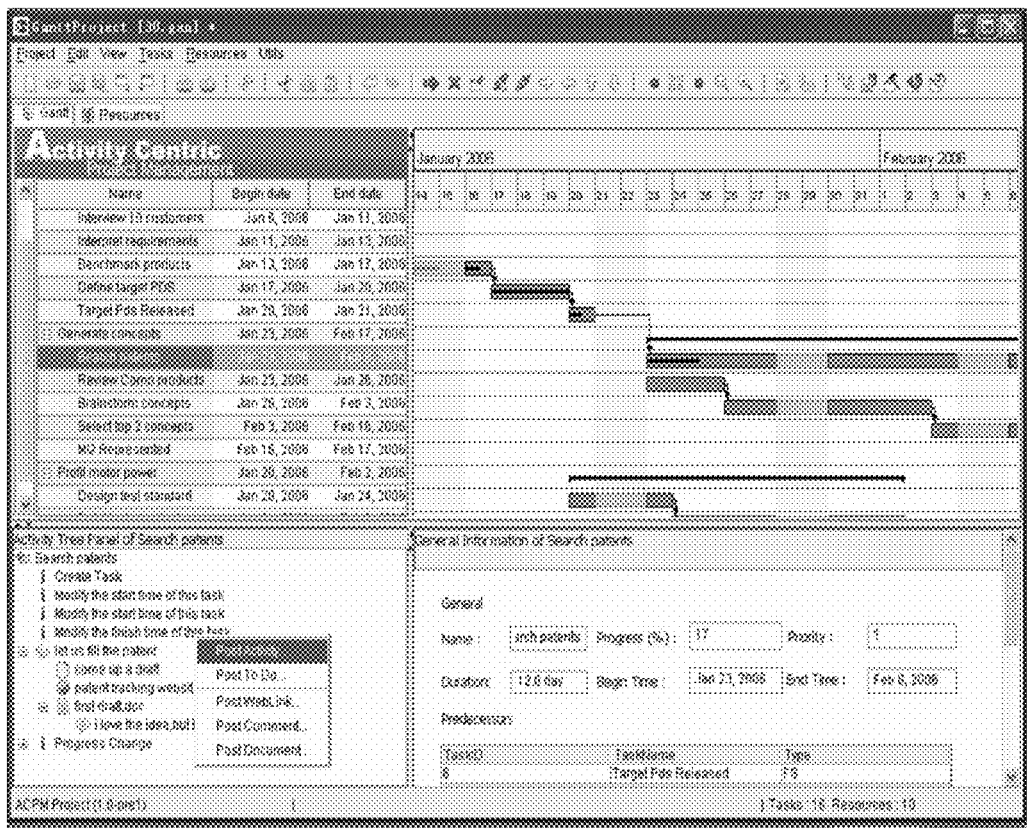
FIG. 5 depicts a graphical user interface of the entire system.

FIG. 5 depicts a graphical user interface, in which a series of tasks of a project are depicted on the up-left corner. A user can make a selection among the series of tasks by using a mouse or keyboard. When the user selects a task, such as search patents (left clicks mouse on the task), then the general information (such as Duration, Begin Time, End Time, Progress and the like) of the task will appear on the down-right of the interface. If the user wants to modify the task, he(she) can left click mouse twice on the task. Then, a dialog box will appear, and the user can modify the task therein, for example, modify the task's Duration, Begin Time, End Time, Progress and the like. Of course, those skilled in the art should understand that the Duration, Begin Time, End Time, and Progress are associated with one another. In other words, in case that Begin Time does not change while End Time changes, Duration changes correspondingly. Besides, the user can change the task's attributes (for example, change the task's Duration) through dragging the mouse on the Gantt charts displaying on the up-right corner of the interface. And the event log engine will capture changes in these tasks made by the user.

Going back to FIG. 2, activity filter and categorizer 114 is a module for categorizing different activities inputted through activity sensor 112.

The functions of activity filter and categorizer 114 mainly include the following three aspects: generating an activity object, filling the object metadata in the activity object, and storing the activity object in activity database 118.

Figure 6:
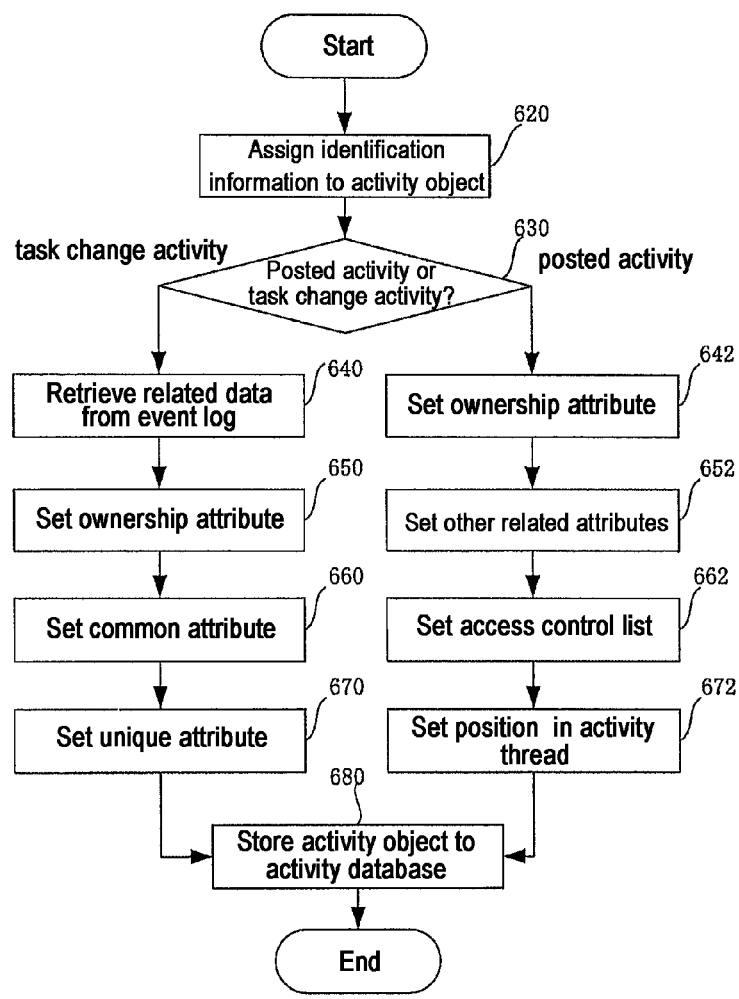
FIG. 6 depicts a flowchart of operation for a new activity object by the activity filter and categorizer depicted in FIG. 1.

FIG. 6 depicts a flowchart of operation for a new activity object by the activity filter and categorizer 114.

First of all, activity object identification information is assigned to the activity object (step 620). The activity object identification information includes activity identifier, activity type, related task, position in the activity thread (because the organization of activity is hierarchical), and the like. They can indicate a unique activity object, and thus will facilitate later search or query.

Next, it is determined whether the activity is a posted activity or a task change activity (determining step 630). There are different procedures for posted activities and task change activities. If the activity is a posted activity, then steps (steps 642, 652, 662, and 672) on the right of FIG. 6 will be performed; if the activity is a task change activity, steps (steps 640, 650, 660, and 670) on the left of FIG. 6 will be performed.

Following described is the case that the activity is a task change activity.

First of all, related data is retrieved from event log via the identification information (such as activity identifier, activity type, related task, and the like) (step 640).

Next, ownership attribute is set (step 650), i.e., to set who conducts the task change activity.

Then, common attribute is set (step 660), for example, to set when the task change activity is conducted, related data values before and after the task change activity, and the like.

Afterwards, unique attribute, such as specific descriptions used for the task change activity, is set (step 670).

Finally, the task change activity object is stored to activity database 118 (step 680).

The following codes illustrate an example of task change activity object.

---

Task change activity object ( )
{
relatedProjectID: 3
relatedTaskID: 8
activity ID: 1
type: start time change
author: Tom
time: 2006-5-18 4:00pm
originalValue: 2006-5-18
currentValue:2006-5-20
}

---

Hereinafter, the description will be made when the activity is a posted activity.

First of all, ownership attribute is set according to the current user (step 642), i.e., to set who posts the activity.

Next, other related attributes, i.e., title, description, state, priority, etc., are set according to user designated values (step 652).

Then, an access control list is set according to the user's designation (step 662). Only users in the access control list can access related data in the posted activity object.

Afterwards, an entry in the activity thread is located according to activity thread position (because various activities are hierarchical) (step 672).

Finally, the posted activity object is stored to activity database 118 (step 680) for later use.

The following codes illustrate an example of posted activity object.

---

Posted activity object ( )
{
relatedProjectID: 3
relatedTaskID: 8
activityID: 2
parentActivityID: 1
type: To Do
author: Harry
title: Discussion on proposal
description: Meeting room202; Participants: Harry, Tom, Mary
access control list:Harry, Tom, Mary
isFinished: no
priority: medium
}

---

As seen from the above, different objects have common elements, such as author, type, and the like. Moreover, some objects have special elements. For example, object of the To Do type has indicators for indicating completion status and priority type. In this way, activity data is structured, and can be indexed and retrieved.

It should be noted that all data recorded to the activity objects comes from activity sensor 112. Moreover, the above flowchart of processing for a new activity object by activity filter and categorizer 114 is illustrative and not limitative. In other words, the order of steps can be changed, and some of the steps can be combined together.

Going back to FIG. 2 again, activity monitor 116 tracks the activity sensor 112 and controls activity filter and categorizer 114 according to the user's actions. When the user's action is an operation of modifying or deleting an existing posted activity, activity monitor 116 performs a corresponding operation on the posted activity object in response to the modification or deletion operation. However, when the user's action is a new posted activity or a task change activity, activity monitor 116 causes the activity filter and categorizer 114 to build a new activity object.

For example, in the user input interface as depicted in FIG. 3, a user can make a selection from posted activities by using a mouse or keyboard (such as moving the mouse or pressing the keyboard). After the user selects a posted activity he(she) desires to modify (such as left clicks the mouse twice on the posted activity), a dialog box will appear, and the user can modify the activity in the dialog box.

Figure 7:
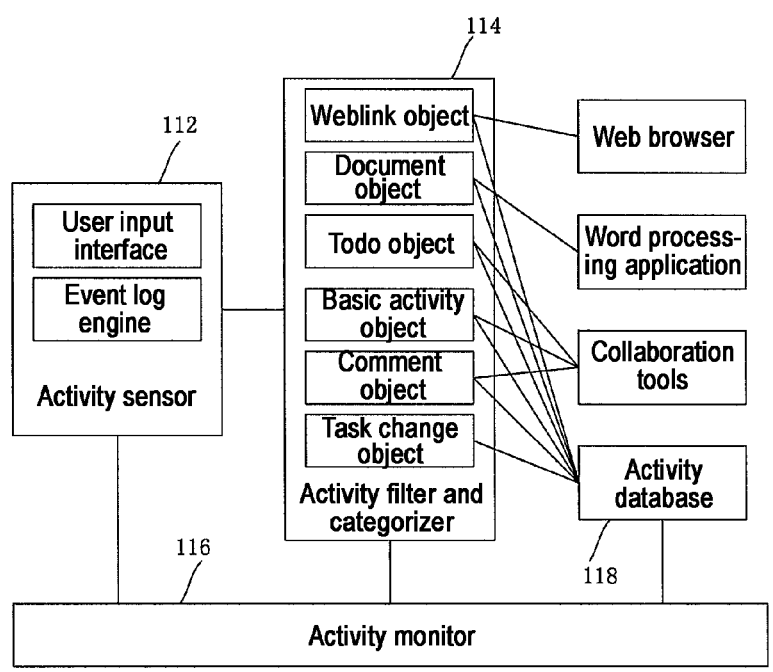
FIG. 7 depicts in greater detail relations between the activity sensor, the activity filter and categorizer, the activity monitor, the activity database, and collaboration tools or applications depicted in FIG. 1.

FIG. 7 depicts in greater detail interrelations between activity sensor 112, activity filter and categorizer 114, activity monitor 116, activity database 118, and collaboration tools or applications. As depicted in FIG. 7, activity filter and categorizer 114 can categorize activity objects into Weblink object, Document object, To Do object, Basic activity object, Comment object and Task change object (corresponding to the user input interface as depicted in FIG. 3 and the event log engine), etc. Weblink object is associated with Web browser, Document object is associated with word processing application, and To Do object, Basic activity object, and Comment object are associated with respective collaborative applications which includes email software, netmeeting software and the like. Moreover, all the activity objects are stored in activity database 118 for retrieving.

Figure 8:
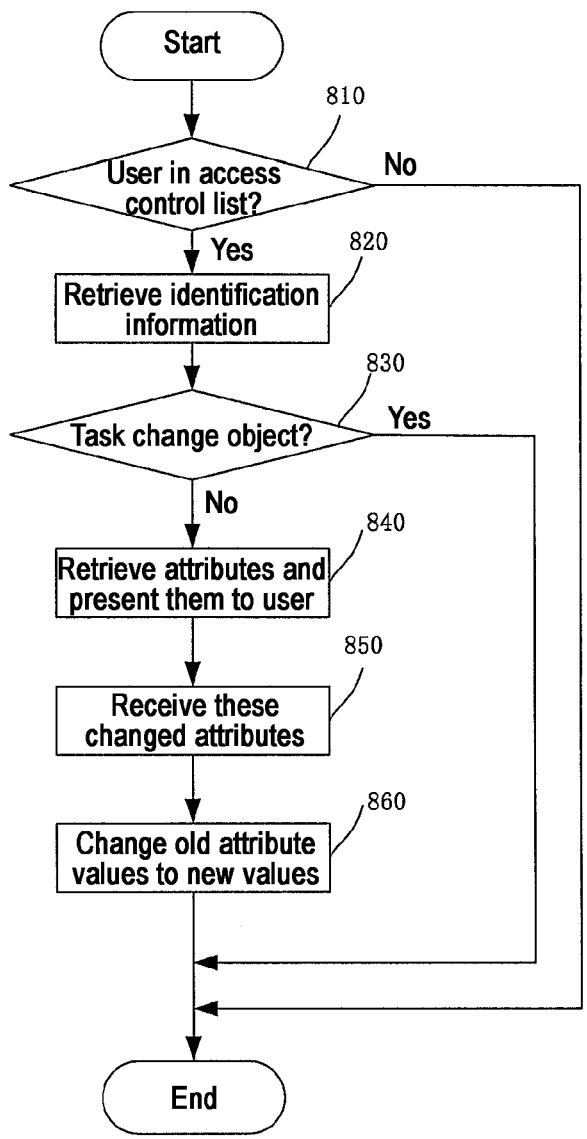
FIG. 8 depicts a flowchart of modifying a posted activity object by the activity monitor depicted in FIG. 1.

FIG. 8 depicts a flowchart for modifying a posted activity object by activity monitor 116.

First of all, whether the user conducting modification is in the access control list is determined (determining step 810). Only users in the access control list can access related data in the posted activity objects and modify them.

If the user is in the access control list (branch "Yes" of determining step 810), then the flow goes to step 820. If the user is not in the access control list (branch "No" of determining step 810), then the flow ends.

In the case that the user is in the access control list, in step 820, identification information which can uniquely identify the to-be-modified object, such as activity identifier, activity type, related task, position in the activity thread, is retrieved from activity sensor 112.

Next, whether the to-be-modified object is a task change object is determined (determining step 830) (whether it is a task change object can be determined by the identification information, namely activity type). Since activity filter and categorizer 114 performs operations concerning task change, the flow ends in case of a task change object (branch "Yes" of determining step 830).

In case of not a task change object (branch "No" of determining step 830), the flow goes to step 840.

In step 840, the activity object's attributes, such as title attribute, description attribute, state attribute, and priority attribute, are retrieved from activity database 118 through the identification information and are presented to the user.

Then, in step 850, changed attributes are received from the user.

And then in step 860, attribute values in activity database 118 are changed to these new attribute values.

The entire flow ends at this point.

Figure 9:
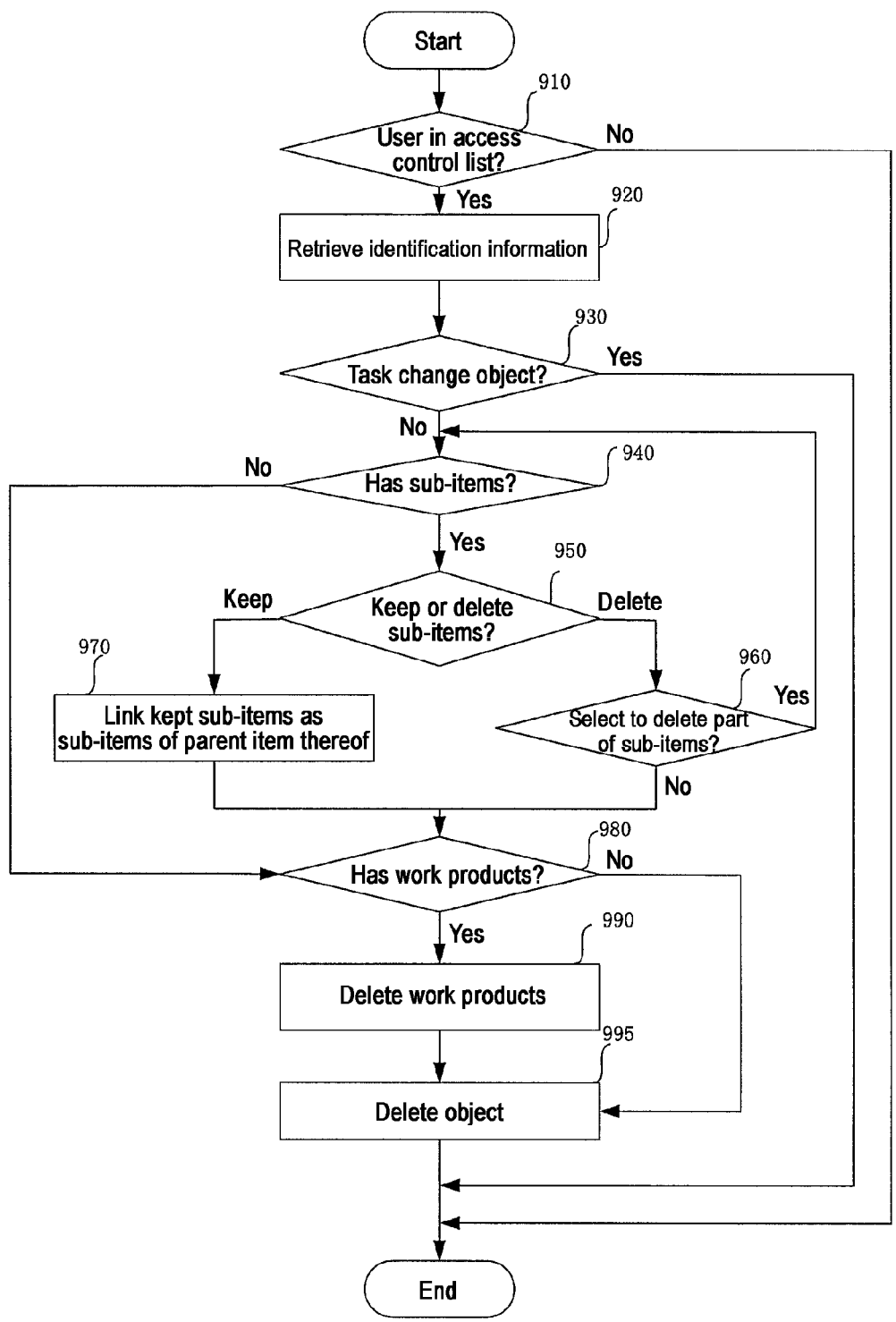
FIG. 9 depicts a flowchart of deleting a posted activity object by the activity monitor depicted in FIG. 1.

FIG. 9 depicts a flowchart for deleting a posted activity object by activity monitor 116.

For example, as depicted in FIG. 3, after a user right clicks the mouse on the to-be-deleted activity, a menu will pop up, on which there is a deleting item. The user can select the deleting item by using a mouse or keyboard (for example, moving mouse or pressing keyboard). After the user selects the deleting item (for example, left clicks mouse on the deleting item), a dialog box will appear, and the user can perform a deletion operation in the dialog box.

First of all, whether the user conducting deletion is in the access control list is determined (determining step 910). Only users in the access control list can access the posted activity object and delete it.

If the user is in the access control list (branch "Yes" of determining step 910), then the flow goes to step 920. If the user is not in the access control list (branch "No" of determining step 910), then the flow ends.

In the case that the user is in the access control list, in step 920, identification information which can uniquely identify the to-be-deleted object, such as activity identifier, activity type, related task, position in the activity thread, is retrieved from activity sensor 112.

Next, whether the to-be-deleted object is a task change object is determined (determining step 930) (whether it is a task change object can be determined by the identification information, namely activity type). Since the user has no right to perform an operation of task change object deletion, the flow ends in case of a task change object (branch "Yes" of determining step 930).

In case of not a task change object (branch "No" of determining step 930), whether the object has sub-items is determined (determining step 940). For example, the determination can be implemented by searching under the object whether there is an object whose parentActivityID is the activityID of the object. For example, in the case that the to-be-deleted object is the My Activity activity object as depicted in FIG. 3, there are two sub-items (sub-objects), namely the Find a meeting room object and the Send the meeting invitation and agenda object.

In the case that there are no sub-items, the flow directly goes to determining step 980. However, if there are sub-items, the flow goes to step 950.

In step 950, whether the user intends to keep or delete the sub-items is determined. For example, the user can keep the Find a meeting room object while delete the Send the meeting invitation and agenda object, and vice versa.

Afterwards, if it is determined in step 950 that the user intends to keep the sub-items, then the flow goes to step 970. In step 970, the kept sub-items are linked as direct sub-items of the parent item of the to-be-deleted object. For example, the Find a meeting room object is linked as a direct sub-item of the Create Task object. Moreover, after step 970 completes, the flow goes to determination step 980. If it is determined in step 950 that the user intends to delete these sub-items, then the flow goes to determining step 960. In determining step 960, whether the user intends to delete part of these sub-items is determined. If it is not to delete part of these sub-items (branch "No" of determining step 960), then the flow goes to determining step 980. However, in the case that it is to delete part of these sub-items (branch "Yes" of determining step 960), steps 940, 950, 960, and 970 are performed for each of to-be-deleted sub-items.

In determining step 980, whether the to-be-deleted object has related work products or artifacts is determined. For example, whether the to-be-deleted object has related documents is determined. In the case that the to-be-deleted object has no related work products or artifacts (branch "No" of determining step 980), the flow directly goes to step 995. However, if the to-be-deleted object has related work products or artifacts (branch "Yes" of determining step 980), the flow goes to step 990.

In step 990, the related work products or artifacts on a file system are deleted via identification information. Examples of file system include, but are not limited to, Fat 16 file system (which supports operating systems including Windows XP, Unix, Linux and the like) and NTFS file system (which supports operating systems including Windows XP). The file system can be presented on client 102 only; or the file system can be presented on server 104 only, for example, in central repository 124; or the file system can be presented on both client 102 and server 104. In other words, the related work products or artifacts can be presented on client 102 only, or can be presented on server 104 only, or can be presented on both client 102 and server 104. Afterwards, the flow goes to step 995.

In step 995, the activity object is deleted.

And the entire flow ends at this point.

Through the interaction among the activity sensor 112, activity filter and categorizer 114, activity monitor 116, and activity database 118, an activity organization of a tree-type structure can be formed.

Model builder 122 is a module for integrating the activity thread and the traditional Work Breakdown Structure (WBS). The Work Breakdown Structure enables the project manager to break down a complicated project into a plurality of manageable tasks according to hierarchical and logical relations, and thus to have a more comprehensive understanding of tasks involved in the project and logical and hierarchical relations among them.

Figure 10:
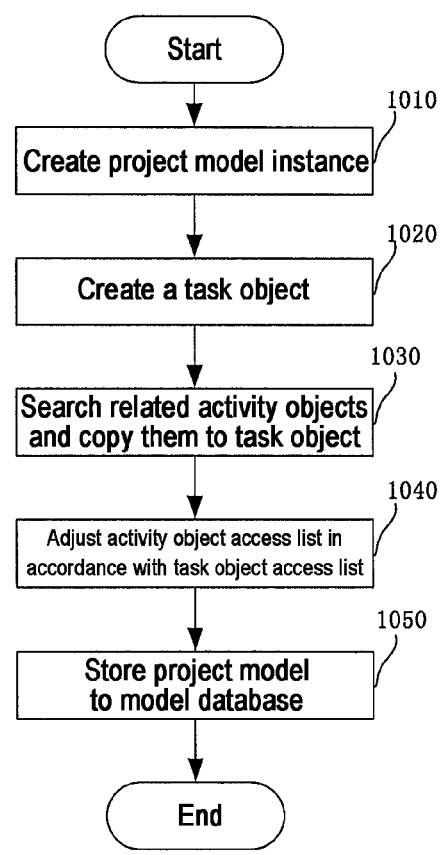
FIG. 10 depicts a flowchart of a project model generation process by the model builder depicted in FIG. 1.

FIG. 10 depicts a flowchart of a project model generation procedure performed by model builder 122. First of all, in step 1010, a project model instance is created for a project, and identification information, such as projectID, projectName, and the like, is also assigned to the project model instance to distinguish it from other project model instances.

The following illustrates a project model instance.

```
Project model ( )
{
projectID: 3
projectName: Activity based computing solution for
business consulting
    lastUpdateTime: 2006-4-15
}
```

Those skilled in the art should understand that the project model instance example merely illustrates some basic elements. As a matter of fact, many other elements can be included, such as tasks included in the project.

Next, in step 1020, a task object is created by putting a WBS task item with identification information, including task ID, task name, name of project the task belongs to, ID of project the task belongs to, ID of parent task of the task, through which the task object can be found in the tree-type structure. Task attributes including owners, duration, progress, dependency, and resource are also copied to the task object, as task object elements.

Next, in step 1030, related activity objects are queried in activity database 118 by the task object's identification information (such as task ID), and the found activity objects are copied to the task object, as task object elements.

Then, in step 1040, the access control list of activity objects is adjusted in accordance with the access control list of the task object. For example, if any user that is not in the access control list of the task object is included in the access control list of activity objects, then the user should be deleted from the access control list of activity objects. And finally, in step 1050, the created project model is stored to a model database in central repository 124. Central repository 124 can further comprise a file system through which related artifacts or work products, like documents, are placed. A user can retrieve related artifacts or work products in the folders or sub-folders of the file system by identification information (such as ID).

The following codes illustrate a task object example.

```
Task object ( )
{
taskID: 8
taskName: Marketing investigation
projectID: 3
projectName: Activity based computing solution for
business consulting
    parentID: 5
    parentName: Market competition analysis report
    depth: 2
    hasChildren: yes
    isMileStone: yes
    isProjectTask: yes
    priority: high
    startTime: 2006-7-20
    endTime: 2006-7-23
    resource: Mary, Harry, Tom
    Access control list:Harry, Tom, Mary
```

```
    completionPercentage: 80%
    duration: 3 days
    critical: yes
}
```

Those skilled in the art should understand that the task object example merely illustrates some basic elements. As a matter of fact, many other elements can be included, such as activity objects associated with the task object.

Model builder 122 can perform the above model generation procedure when a project is completed, so as to create a project model instance.

Of course, model builder 122 can perform the above model generation procedure in real time, so as to create a project model instance. Since the project has not been completed, many activities will arise with the progressing of the project, and model builder 122 needs to frequently modify the project model instance in order to reflect the latest activity. The way of frequently modifying the project model instance can be understood by those skilled in the art, and thus related detailed description is omitted here.

Through the above procedure, all the activities associated with a project are well recorded, and the project manager can track all the activities that occurred during the project, and team members can share related information and knowledge.

Graphical user interface engine 120 can provide a user with graphical interface representation of the project model involving a good many of collaborative activities by querying the model database in central repository 124, so that the user can understand the progress and execution status of the project in time.

FIG. 5 described above is a graphical user interface obtained through screenshot. The up-left portion is the Work Breakdown Structure included in a project. A user can make a selection among the series of tasks by using a mouse or keyboard. When the user selects a task (search patents) (for example, left clicks a mouse on the task), the general information of the task will appear in the down-right portion of the graphical user interface, and an activity information panel of the task will appear in the down-left portion of the graphical user interface, and Gantt charts of the task will appear in the up-right corner of the graphical user interface.

Figure 11:
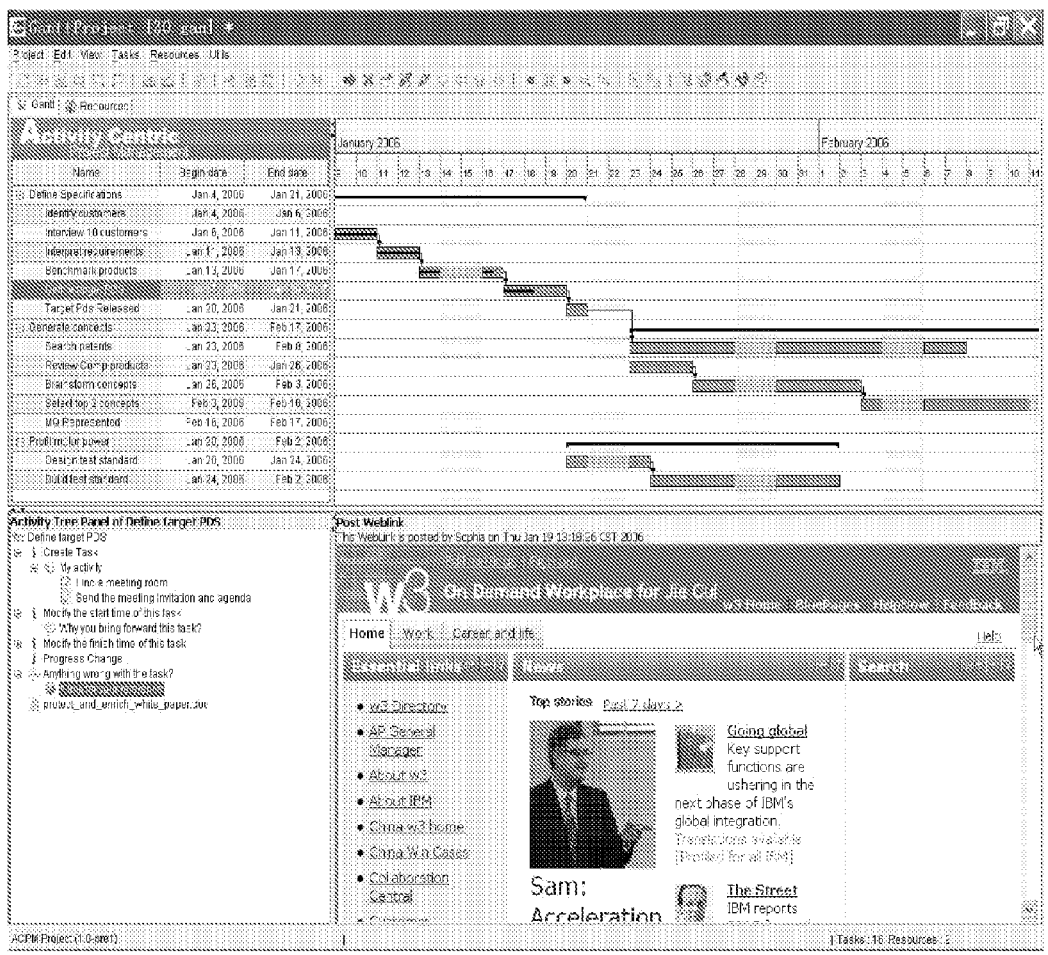
FIGS. 11 and 12 respectively depict other two graphical user interfaces obtained through screenshot.
Figure 12:
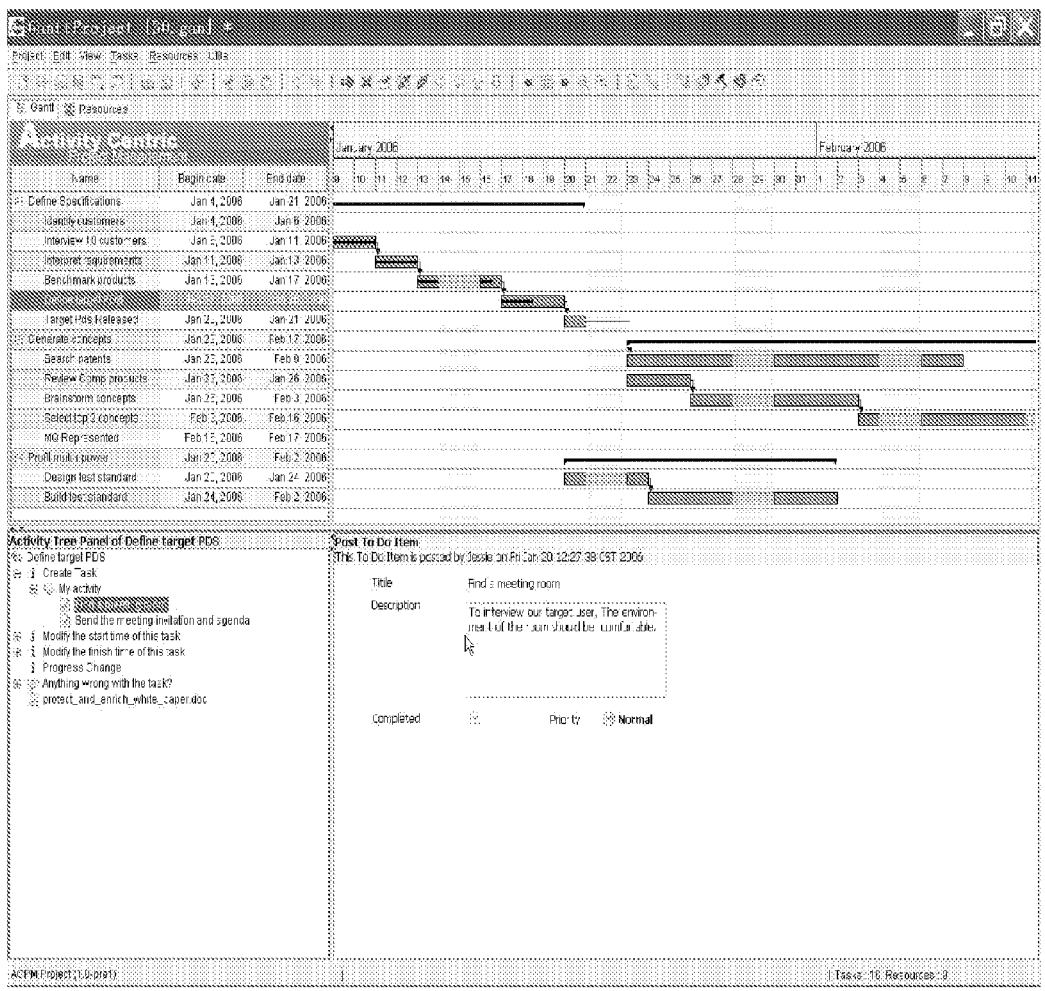

FIGS. 11 and 12 respectively depict other two graphical user interfaces obtained through screenshot. The difference of FIGS. 11 and 12 from FIG. 5 is that when a user selects an activity in the activity information panel on the down-left portion (for example, left clicks a mouse on the activity), information of the activity will appear in the down-right corner of the graphical user interface. FIG. 11 depicts the case where the selected activity is a posted Weblink activity, whereas FIG. 12 depicts the case where the selected activity is a posted To Do activity.

It should be noted that in order to facilitate easier understanding of the present invention, the above description omits more detailed technical details that are well known to those skilled in the art and might be indispensable to the implementation of the present invention.

The description of the present invention has been presented for purposes of illustration and description, and is not intended to be exhaustive or limited to the invention in the form disclosed. Many modifications and variations will be apparent to those of ordinary skill in the art. For example, the activity sensor 112, activity filter and categorizer 114, activity monitor 116, activity database 118, graphical user interface engine 120, model builder 122, and central repository 124 can be arranged on the same device other than the client-server configuration. Still for example, the activity database 118 and the central repository 124 can be on the same device. That is to say, activity database 118 does not exist in the locality of client 102, and all activity objects are stored in central repository 124 of server 104.

In addition, the main purpose of arranging activity filter and categorizer 114, activity monitor 116, and activity database 118 is to filter and categorize activity data received by activity sensor 112, in order to facilitate employing by model builder 122. Of course, it is also feasible not to arrange activity filter and categorizer 114, activity monitor 116, and activity database 118 and to directly deliver activity data received by activity sensor 112 to model builder 122.

Therefore, the embodiments were chosen and described in order to best explain the principles of the invention, the practical application, and to enable others of ordinary skill in the art to understand that all modifications and alterations made without departing from the spirit of the present invention fall into the protection scope of the present invention as defined in the appended claims.

What is claimed is:

1. A system for managing activities in project management, comprising:
    at least one processor device;
    an activity sensor for collecting project activity data from user inputs and project task change event logs wherein activity data from user inputs comprises posting activity and deletions and activity data from project task change event logs comprises user input of operations on project tasks;
    a project model builder for creating a project model by integrating said activity data with project tasks; and
    a central repository for storing the created project model created by said model builder.

2. The system according to claim 1, further comprising:
    an activity filter and categorizer for categorizing the activity data collected by said activity sensor to create an activity object; and
    an activity database for storing the activity object created by said activity filter and categorizer to provide it to said model builder.

3. The system as claimed in claim 2, further comprising:
    an activity monitor for tracking said activity sensor, and for, based on an activity, causing said activity filter and categorizer to categorize the activity data and create an activity object, or modifying or deleting a created activity object.

4. The system as claimed in claim 1, further comprising:
    a graphical user interface engine for providing a user with graphical interface representation of a created project model involving various activities by querying the project model in said central repository.

5. The system as claimed in claim 1, wherein said activity sensor comprises:
    a user input interface for user input of various project activities; and
    an event log engine for capturing various project task change activities.

6. The system as claimed in claim 1, wherein said model builder further can update said created project model in accordance with the activity data obtained from said activity sensor.

7. A method for managing activities in project management, comprising the steps of:
    collecting project activity data from user inputs and project task change event logs wherein activity data from user inputs comprises posting activity and deletions and activity data from project task change event logs comprises user input of operations on project tasks;
    creating a project model by integrating said activity data with project tasks; and
    storing the created project model.

8. The method as claimed in claim 7, further comprising:
    categorizing the collected activity data to create an activity object; and
    storing the created activity object to provide it to the step of creating a project model.

9. The method as claimed in claim 7, further comprising:
    updating said created project model in accordance with said obtained activity data.

10. The method as claimed in claim 8, further comprising:
    monitoring said step of collecting activity data to perform said step of categorizing the collected activity data to create an activity object or to perform the step of modifying or deleting a created activity object.

11. The method as claimed in claim 7, further comprising:
    providing a user with graphical interface representation of a created project model involving various activities by querying said project model.

12. A computer program product comprising computer program stored in a non-transitory computer executable medium configured to implement method steps for managing activities in project management, comprising the steps of:
    collecting project activity data from user inputs and project task change event logs wherein activity data from user inputs comprises posting activity and deletions and activity data from project task change event logs comprises user input of operations on project tasks;
    creating a project model by integrating said activity data with project tasks; and
    storing the created project model.

* * * * *